United States Patent
Huang et al.

(10) Patent No.: US 8,462,138 B2
(45) Date of Patent: Jun. 11, 2013

(54) OPTICAL TOUCH MODULE CAPABLE OF INCREASING LIGHT EMITTING ANGLE OF LIGHT EMITTING UNIT

(75) Inventors: Po-Liang Huang, New Taipei (TW); Chia-Jui Liu, New Taipei (TW)

(73) Assignee: Wistron Corporation, Xizhi Dist., New Taipei (TW)

( * ) Notice: Subject to any disclaimer, the term of this patent is extended or adjusted under 35 U.S.C. 154(b) by 345 days.

(21) Appl. No.: 13/048,888

(22) Filed: Mar. 16, 2011

(65) Prior Publication Data
US 2012/0139875 A1    Jun. 7, 2012

(30) Foreign Application Priority Data
Dec. 2, 2010  (TW) .............................. 99141895 A

(51) Int. Cl.
*G06F 3/042* (2006.01)
(52) U.S. Cl.
USPC ........................................ 345/175; 345/173
(58) Field of Classification Search
USPC .................. 345/156, 173, 175, 104
See application file for complete search history.

(56) References Cited

U.S. PATENT DOCUMENTS

| | | | |
|---|---|---|---|
| 6,690,268 B2* | 2/2004 | Schofield et al. | 340/438 |
| 8,203,764 B2* | 6/2012 | King et al. | 358/450 |
| 2005/0122308 A1* | 6/2005 | Bell et al. | 345/156 |
| 2009/0002774 A1* | 1/2009 | King et al. | 358/474 |
| 2010/0253916 A1* | 10/2010 | Gao et al. | 353/7 |
| 2010/0253917 A1* | 10/2010 | Gao et al. | 353/7 |
| 2010/0315413 A1* | 12/2010 | Izadi et al. | 345/419 |

* cited by examiner

*Primary Examiner* — Ricardo L Osorio
(74) *Attorney, Agent, or Firm* — Winston Hsu; Scott Margo

(57) ABSTRACT

An optical touch module includes a screen and at least one optical positioning device disposed on the screen. The optical positioning device includes a case, at least one light emitting unit, a circuit board, a transparent diffusing part and an image capturing unit. The light emitting unit is disposed on case for emitting invisible light. The circuit board is electrically connected to the light emitting unit for controlling the light emitting unit. The transparent diffusing part is disposed at a light emitting side of the light emitting unit. A bar structure is formed on a light entrance surface of the transparent diffusing part for scattering the invisible light to be distributed over a touch surface of the screen. The image capturing unit is disposed on the case to capture an optical image for a touch object on the touch surface when the touch object is illuminated by the invisible light.

15 Claims, 6 Drawing Sheets

OPTICAL TOUCH MODULE CAPABLE OF INCREASING LIGHT EMITTING ANGLE OF LIGHT EMITTING UNIT

BACKGROUND OF THE INVENTION

1. Field of the Invention

The invention relates to an optical touch module, and more specifically, to an optical touch module capable of increasing a light emitting angle of a light emitting unit disposed therein.

2. Description of the Prior Art

In general, a conventional optical touch module utilizes a light interruption method or a direct image capturing method to detect a position of a user's finger on a touch surface. Both of the two methods utilize two (or three) image capturing devices and a near-infrared light emitting device. The said two image capturing devices are usually disposed at upper-left and upper-right corners of a touch screen, respectively. The difference between the two methods is that the light interruption method utilizes a background lighting design, in which a reflective bar or a near-infrared light emitting bar is disposed around the touch screen. In the light interruption method, a user's finger is taken as an interruption object for partially interrupting light, which is emitted from the reflective bar or the near-infrared light emitting bar, when touching the touch screen. At this time, a position of the user's finger on the touch screen can be calculated accordingly by utilizing the said image capturing devices to capture related optical images and then performing corresponding image processing. On the other hand, the direct image capturing method utilizes a near-infrared light emitting device to illuminate a user's finger directly instead of the said background lighting design. Subsequently, a position of the user's finger on the touch screen can also be calculated by utilizing the said image capturing devices to capture related optical images and then performing corresponding image processing.

Compared with the light interruption method, in which the length of the reflective bar or the near-infrared light emitting bar needs to be increased accordingly when the size of the touch screen is enlarged, the direct image capturing method is more suitable for a monitor with a large size (e.g. a 20-inch monitor). However, the area of the touch surface is also increased when the size of the touch screen is enlarged. Thus, if the direct image capturing method is applied to a monitor with a large size, uneven light distribution over the enlarged touch surface may occur since only part of the enlarged touch surface can be covered by light emitted from the near-infrared light emitting device. As a result, optical images in different regions on the enlarged touch surface are different from each other in brightness, so as to influence accuracy of the optical touch module in optical positioning. Furthermore, incorrect positioning or touch failure may also occur due to the exceeding light brightness differences on the touch surface.

SUMMARY OF THE INVENTION

An embodiment of the invention provides an optical touch module capable of increasing a light emitting angle of a light emitting unit. The optical touch module includes a screen and at least one optical positioning device. The screen has a touch surface. The optical positioning device is disposed on the screen. The optical positioning device includes a case, at least one light emitting unit, a circuit board, a transparent diffusing part, and an image capturing unit. The light emitting unit is disposed on the case for emitting invisible light. The circuit board is electrically connected to the light emitting unit for controlling the light emitting unit. The transparent diffusing part is disposed at a light emitting side of the light emitting unit. A bar structure is formed on a light entrance surface of the transparent diffusing part for scattering the invisible light to be distributed over the touch surface. The image capturing unit is disposed on the case for capturing an optical image of a touch object on the touch surface when the touch object is illuminated by the invisible light.

These and other objectives of the invention will no doubt become obvious to those of ordinary skill in the art after reading the following detailed description of the preferred embodiment that is illustrated in the various figures and drawings.

DETAILED DESCRIPTION

Figure 1:
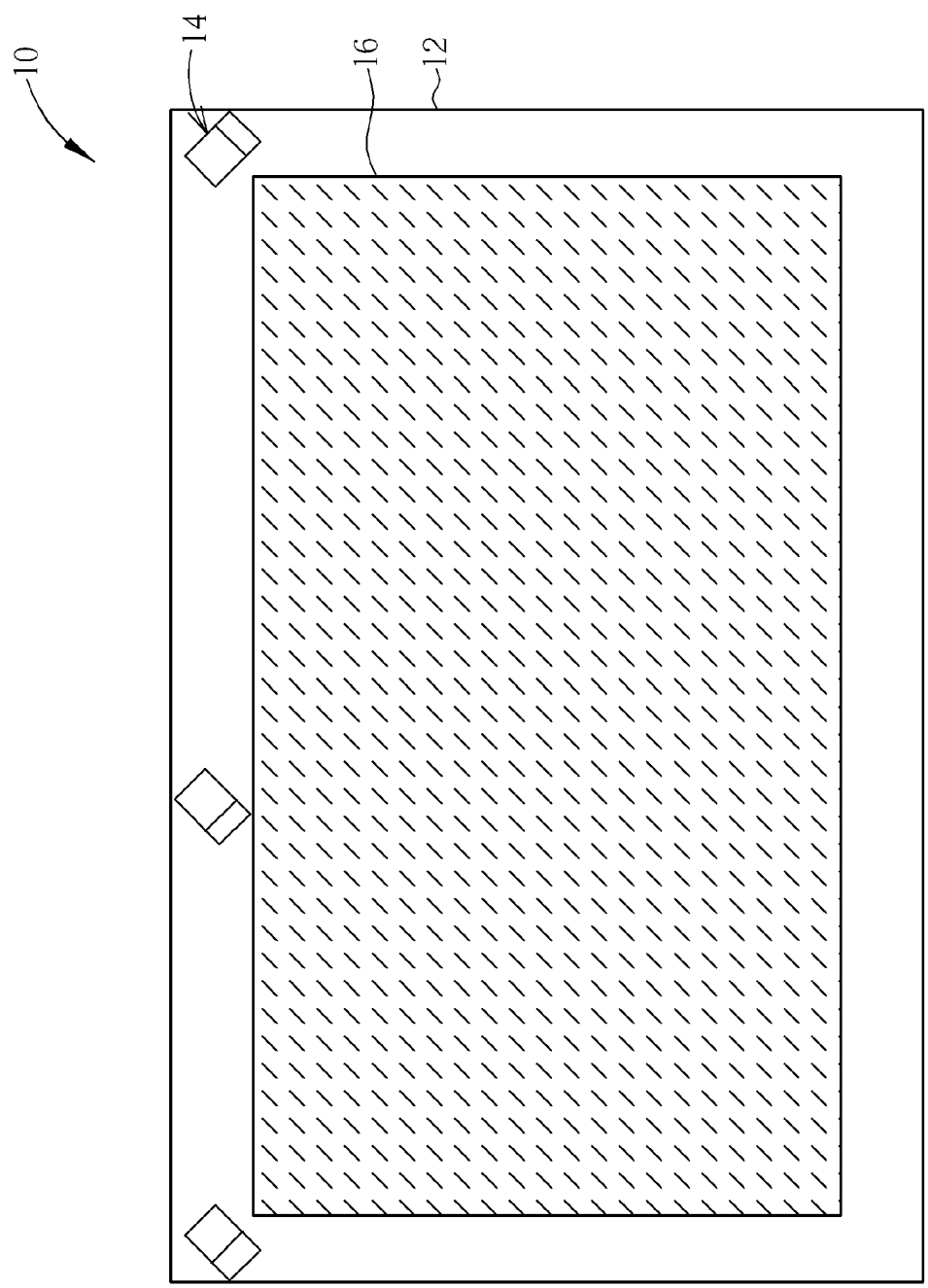
FIG. 1 is a diagram of an optical touch module according to an embodiment of the invention.

Please refer to FIG. 1, which is a diagram of an optical touch module 10 according to an embodiment of the invention. As shown in FIG. 1, the optical touch module 10 includes a screen 12 and at least one optical positioning device 14 (three shown in FIG. 1). The optical positioning devices 14 are disposed at an upper-left corner, an upper side, and an upper-right corner of the screen 12, respectively, but are not limited thereto. For example, there can be only the upper-left and the upper-right corners of the screen 12 having the optical positioning device 14 disposed thereon for simplifying the configuration of the optical touch module 10. The screen 12 has a touch surface 16 for a user to perform touch operations.

Figure 2:
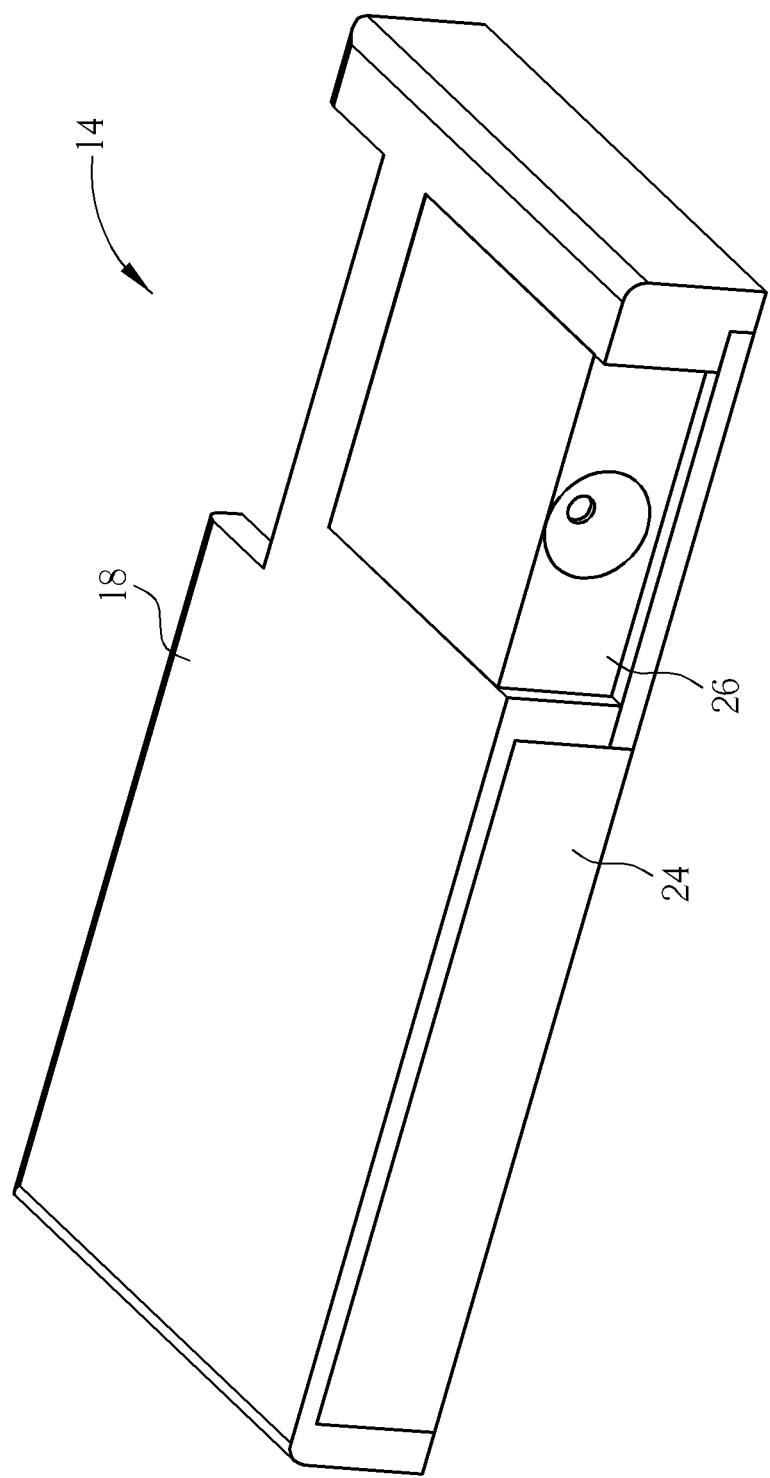
FIG. 2 is an exterior diagram of an optical positioning device in FIG. 1.
Figure 3:
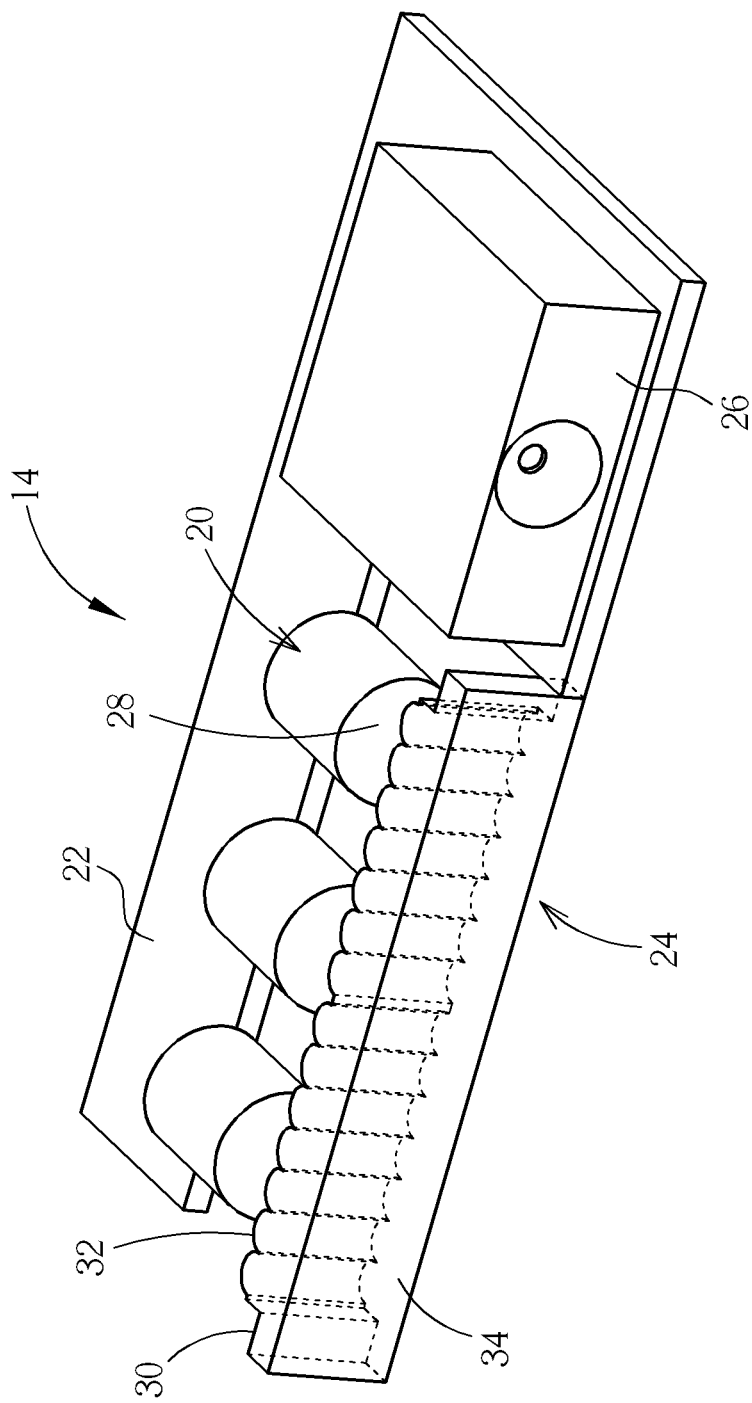
FIG. 3 is an interior diagram of the optical positioning device in FIG. 2.

Next, please refer to FIG. 2 and FIG. 3. FIG. 2 is an exterior diagram of the optical positioning device 14 in FIG. 1. FIG. 3 is an interior diagram of the optical positioning device 14 in FIG. 2. As shown in FIG. 2 and FIG. 3, the optical touch module 14 includes a case 18, at least one light emitting unit 20 (three shown in FIG. 3), a circuit board 22, a transparent diffusing part 24, and an image capturing unit 26. The light emitting unit 20 is disposed on the case 18 for emitting invisible light. The light emitting unit 20 is preferably a near-infrared lamp LED (Light Emitting Diode), a half-light-intensity angle and a diameter of which are equal to 40 degrees and 5 mm, respectively, but is not limited thereto. In other words, the optical positioning device 14 can adopt other light emitting unit capable of emitting invisible light instead. As for which type of light emitting unit is utilized, it depends on the practical application of the optical touch module 10. The circuit board 22 is electrically connected to the light emitting unit 20, and is preferably a printed circuit board for controlling the light emitting unit 20. The transparent diffusing part 24 is disposed at a light emitting side 28 of the light emitting unit 20 for receiving the invisible light emitted by the light emitting unit 20. The transparent diffusing part 24 is preferably made of transparent acrylic material. A bar structure 32 is formed on a light entrance surface 30 of the transparent diffusing part 24. As shown in FIG. 3, in this embodiment, the bar structure 32 is a continuous arc-shaped bar structure, a radius of each arc on which is substantially equal to 0.7 mm. The bar structure 32 is used for scattering the invisible light emitted by the light emitting unit 20 to be distributed over the touch surface 16, so as to increase a covering area of the invisible light on the touch surface 16. The image capturing unit 26 is disposed on the case 18 for capturing an optical image for a touch object (e.g. a stylus, a user's finger, etc.) on the touch surface 16 when the touch object is illuminated by the invisible light. The captured optical image can be used as a reference for the following optical touch positioning of the touch object.

Figure 4:
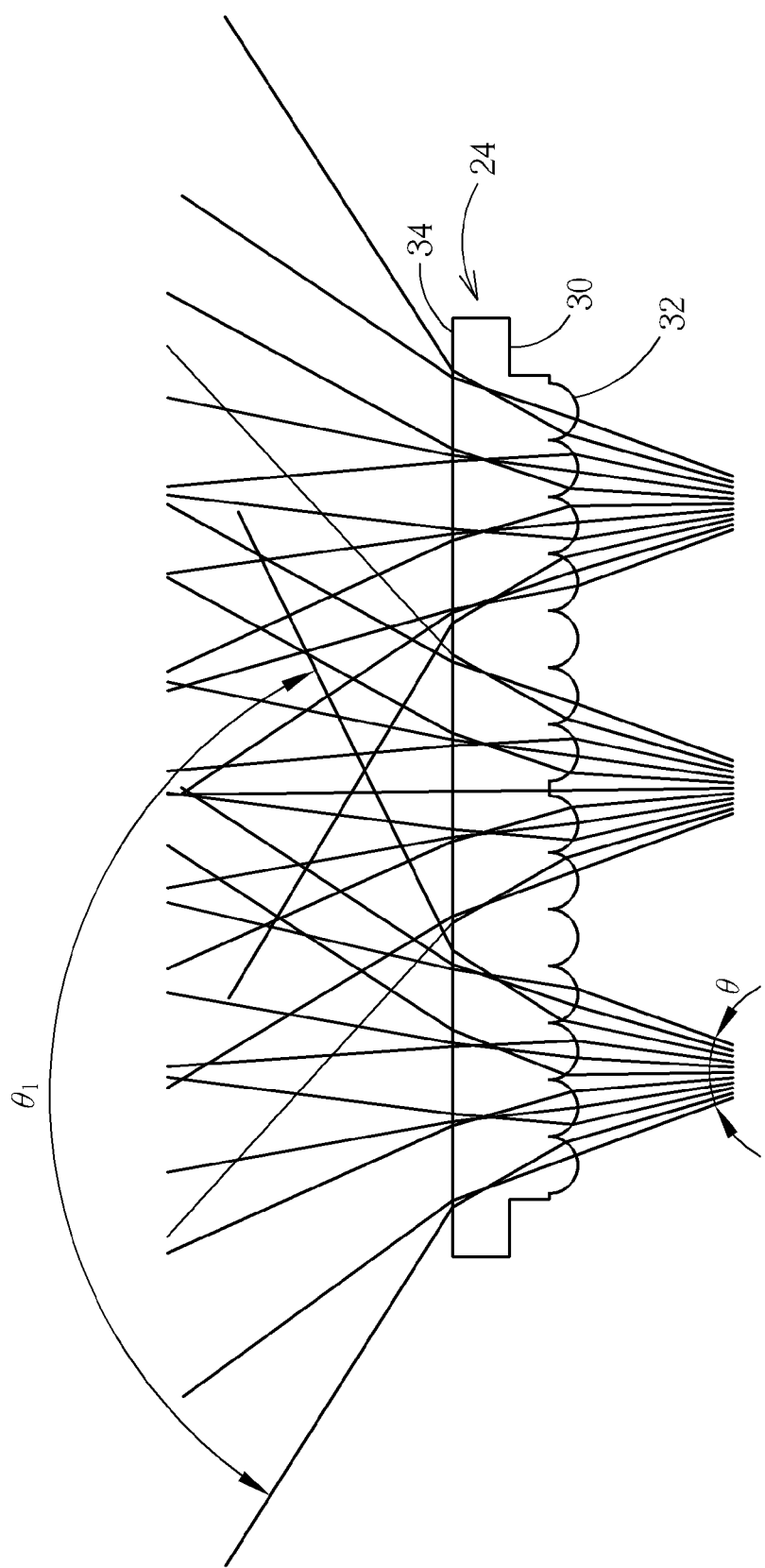
FIG. 4 is a top view of invisible light being scattered by a transparent diffusing part in FIG. 3.
Figure 5:
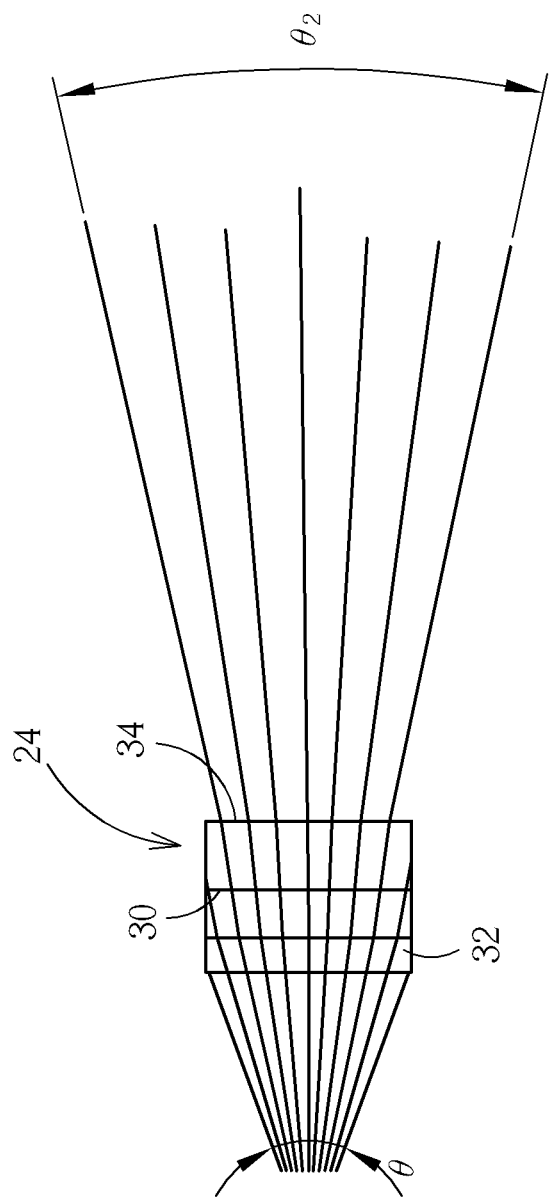
FIG. 5 is a side view of the invisible light being scattered by the transparent diffusing part in FIG. 3.

More detailed description for the light scattering design of the optical positioning device 14 located at the upper-right corner of the screen 12 as shown in FIG. 1 is provided as follows. As for the light scattering designs of the optical positioning devices 14 respectively located at the upper-left corner and the upper side of the screen 12 as shown in FIG. 1, the related description can be reasoned by analogy and be therefore omitted herein. Please refer to FIG. 1, FIG. 3, FIG. 4, and FIG. 5. FIG. 4 is a top view of the invisible light being scattered by the transparent diffusing part 24 in FIG. 3. FIG. 5 is a side view of the invisible light being scattered by the transparent diffusing part 24 in FIG. 3. After the bar structure 32 receives the invisible light emitted by the light emitting unit 20, the arc-shaped contour of the bar structure 32 in a horizontal direction scatters the invisible light, and then refraction of the invisible light occurs on a light exit surface 34 of the transparent diffusing part 24. In such a manner, as shown in FIG. 4, the invisible light with one light emitting angle $\theta$ in the horizontal direction is changed to has another light emitting angle $\theta_1$ after passing through the bar structure 32 and then refracting from the light exit surface 34 to the touch surface 16. The said light emitting angle $\theta$ is substantially equal to 40 degrees, and the light emitting angle $\theta_1$ is substantially equal to 122 degrees.

That is, via the design that the transparent diffusing part 24 is disposed at the light emitting side 28 of the light emitting unit 20 and the bar structure 32 is formed on the light entrance surface 30 of the transparent diffusing part 24, the covering area of the invisible light over the touch surface 16 can be increased greatly, so as to achieve the purpose that the invisible light is distributed over the touch surface 16 uniformly. Furthermore, since the bar structure 32 has no curvature variation in a vertical direction as shown in FIG. 5, plus the area of the light exit surface 34 of the transparent diffusing part 24 is limited, the invisible light with the light emitting angle $\theta$ in the vertical direction is changed to has another light emitting angle $\theta_2$ after refracting from the light exit surface 34 to the touch surface 16. The light emitting angle $\theta$ is substantially equal to 40 degrees, and the light emitting angle $\theta_2$ is substantially equal to 25 degrees.

In summary, according to the said structural designs, the invisible light emitted by the light emitting unit 20 can be transformed into a slim light beam, which has the light emitting angle of 25 degrees in the vertical direction and the light emitting angle of 122 degrees in the horizontal direction, after passing through the bar structure 54 and then being scattered. As a result, light distribution over the touch surface 16 can be more uniform, and light use efficiency of the light emitting unit 20 in optical touch positioning can be further increased.

Figure 6:
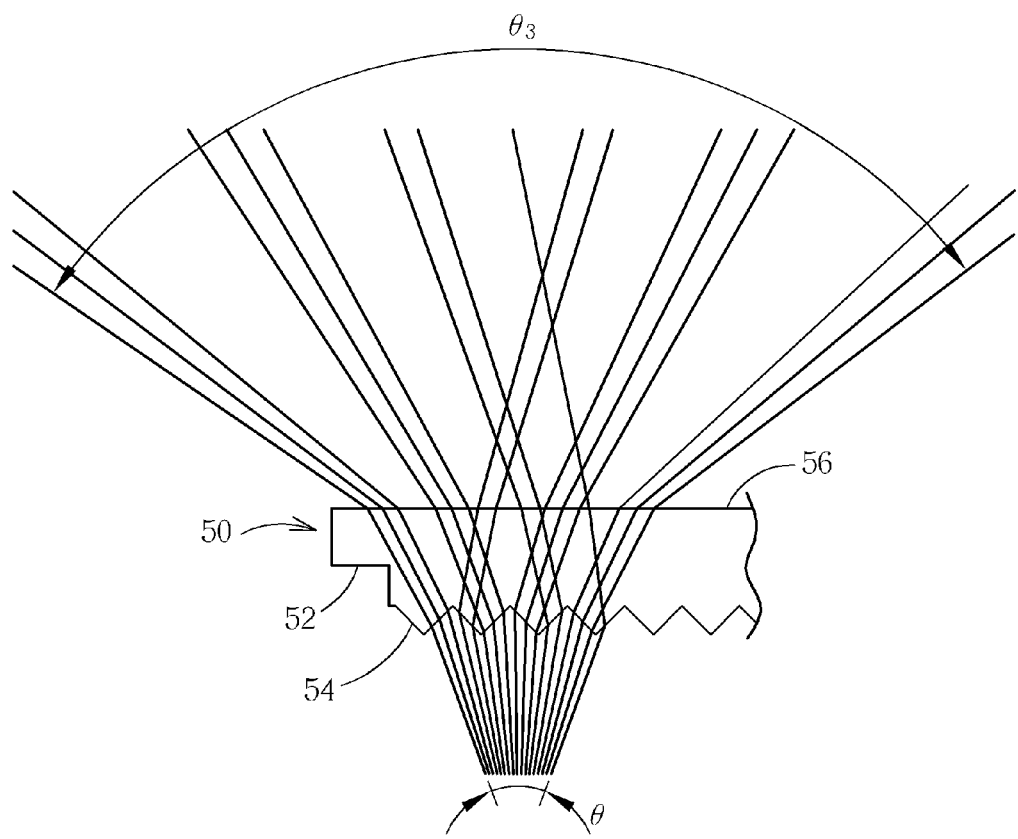
FIG. 6 is a partial top view of invisible light being scattered by a transparent diffusing part according to another embodiment of the invention.

Please refer to FIG. 6, which is a partial top view of the invisible light being scattered by a transparent diffusing part 50 according to another embodiment of the invention. The major difference between the transparent diffusing part 50 and the transparent diffusing part 24 is the structural design of the bar structure. As shown in FIG. 6, a bar structure 54 is formed on a light entrance surface 52 of the transparent diffusing part 50. In this embodiment, the bar structure 54 is a continuous tooth-shaped bar structure, a vertex angle of each tooth on which is substantially equal to 30 degrees. After the bar structure 54 receives the invisible light emitted by the light emitting unit 20, the tooth-shaped contour of the bar structure 54 in a horizontal direction scatters the invisible light, and then refraction of the invisible light occurs on a light exit surface 56 of the transparent diffusing part 50. In such a manner, as shown in FIG. 6, the invisible light with the light emitting angle $\theta$ in the horizontal direction is changed to has another light emitting angle $\theta_3$ after passing through the bar structure 54 and then refracting from the light exit surface 56 to the touch surface 16. The said light emitting angle $\theta$ is substantially equal to 40 degrees, and the light emitting angle $\theta_3$ is substantially equal to 118 degrees.

In brief, via the design that the transparent diffusing part 50 is disposed at the light emitting side 28 of the light emitting unit 20 and the bar structure 54 is formed on the light entrance surface 52 of the transparent diffusing part 50, the covering area of the invisible light over the touch surface 16 can be increased greatly, so as to achieve the purpose that the invisible light is distributed over the touch surface 16 uniformly. Similarly, the bar structure 54 also has no curvature variation in a vertical direction, and the area of the light exit surface 56 of the transparent diffusing part 50 is also limited. Thus, the invisible light with the light emitting angle $\theta$ in the vertical direction is also changed to has another light emitting angle $\theta_2$ after refracting from the light exit surface 56 to the touch surface 16. The light emitting angle $\theta$ is substantially equal to 40 degrees, and the light emitting angle $\theta_2$ is substantially equal to 25 degrees.

In summary, according to the said structural designs, the invisible light can be transformed into a slim light beam, which has the light emitting angle of 25 degrees in the vertical direction and the light emitting angle of 118 degrees in the horizontal direction, after passing through the bar structure 54 and then being scattered. As a result, light distribution over the touch surface 16 can be more uniform, and light use efficiency of the light emitting unit 20 in optical touch positioning can be further increased.

It should be mentioned that the bar structure on the transparent diffusing part is not limited to the continuous arc-shaped bar structure and the continuous tooth shaped bar structure mentioned in the said embodiments. For example, the bar structure can be a discontinuous arc-shaped bar structure, wherein a radius of each arc on the discontinuous arc-shaped bar structure is substantially equal to 0.7 mm and a distance between two bars of the discontinuous arc-shaped bar structure is substantially equal to 1.2 mm. The bar structure can also be a discontinuous tooth-shaped bar structure, wherein a vertex angle of each tooth on the discontinuous tooth-shaped bar structure is substantially equal to 30 degrees and a distance between two bars of the discontinuous tooth-shaped bar structure is substantially equal to 1.4 mm. Furthermore, the invention may also utilize other bar structure having the same light scattering effect, such as a continuous polygon bar structure. In other words, all designs for forming a bar structure having the same light scattering effect on the light entrance surface of the transparent diffusing part may fall within the scope of the invention.

Furthermore, the radius of each arc on the said arc-shaped bar structure can be different from one another for changing the shape of the slim light beam. For example, the radius of each arc can vary with the measure of the distance between itself and the light emitting unit. Similarly, the vertex angle of each tooth on the said tooth-shaped bar structure can also be different from one another. For example, the vertex angle of each tooth can vary with the measure of the distance between itself and the light emitting unit.

Compared with the prior art, the invention utilizes the design that the transparent diffusing part is disposed at the light emitting side of the light emitting unit and the bar structure is formed on the light entrance surface of the transparent diffusing part, to make invisible light emitted by the light emitting unit scatter for generating a slim light beam. Thus, a covering area of the invisible light over the touch surface can be increased accordingly, so as to achieve the purpose that the invisible light can be distributed over the touch surface uniformly. In such a manner, the optical touch module of the invention can not only make light distribution over the touch surface more uniform, so as to increase accuracy of optical touch positioning of a touch object on the touch surface, but also avoid incorrect positioning or touch failure caused by uneven light distribution over the touch surface. Furthermore, light use efficiency of the light emitting unit in optical touch positioning can also be increased.

Those skilled in the art will readily observe that numerous modifications and alterations of the device and method may be made while retaining the teachings of the invention.

What is claimed is:

1. An optical touch module capable of increasing a light emitting angle of a light emitting unit, the optical touch module comprising:
    a screen having a touch surface; and
    at least one optical positioning device disposed on the screen, the optical positioning device comprising:
        a case;
        at least one light emitting unit disposed on the case for emitting invisible light;
        a circuit board electrically connected to the light emitting unit for controlling the light emitting unit;
        a transparent diffusing part disposed at a light emitting side of the light emitting unit, a bar structure being formed on a light entrance surface of the transparent diffusing part for scattering the invisible light to be distributed over the touch surface; and
        an image capturing unit disposed on the case for capturing an optical image of a touch object on the touch surface when the touch object is illuminated by the invisible light.

2. The optical touch module of claim 1, wherein the light emitting unit is a near-infrared lamp LED.

3. The optical touch module of claim 2, wherein a diameter of the near-infrared lamp LED is substantially equal to 5 mm.

4. The optical touch module of claim 1, wherein a half-light-intensity of the light emitting unit is substantially equal to 40 degrees.

5. The optical touch module of claim 1, wherein the transparent diffusing part is made of transparent acrylic material.

6. The optical touch module of claim 1, wherein the bar structure is a continuous tooth-shaped bar structure.

7. The optical touch module of claim 6, wherein a vertex angle of the continuous tooth-shaped bar structure is substantially equal to 30 degrees.

8. The optical touch module of claim 1, wherein the bar structure is a discontinuous tooth-shaped bar structure.

9. The optical touch module of claim 8, wherein a vertex angle of the discontinuous tooth-shaped bar structure is substantially equal to 30 degrees.

10. The optical touch module of claim 8, wherein a distance between two bars on the discontinuous tooth-shaped bar structure is substantially equal to 1.4 mm.

11. The optical touch module of claim 1, wherein the bar structure is a continuous arc-shaped bar structure.

12. The optical touch module of claim 11, wherein a radius of the continuous arc-shaped bar structure is substantially equal to 0.7 mm.

13. The optical touch module of claim 1, wherein the bar structure is a discontinuous arc-shaped bar structure.

14. The optical touch module of claim 13, wherein a radius of the discontinuous arc-shaped bar structure is substantially equal to 0.7 mm.

15. The optical touch module of claim 13, wherein a distance between two bars of the discontinuous arc-shaped bar structure is substantially equal to 1.2 mm.

* * * * *